United States Patent
Kao et al.

(10) Patent No.: US 11,563,589 B2
(45) Date of Patent: Jan. 24, 2023

(54) CERTIFICATE MANAGEMENT SYSTEM AND CERTIFICATE MANAGEMENT METHOD

(71) Applicant: MOXA INC., New Taipei (TW)

(72) Inventors: Chi-Yuan Kao, New Taipei (TW); Yu-Chen Kao, New Taipei (TW); Hung-Chun Chen, New Taipei (TW); Chih-Hsiung Shih, New Taipei (TW)

(73) Assignee: MOXA INC., New Taipei (TW)

( * ) Notice: Subject to any disclaimer, the term of this patent is extended or adjusted under 35 U.S.C. 154(b) by 0 days.

(21) Appl. No.: 17/110,476

(22) Filed: Dec. 3, 2020

(65) Prior Publication Data

US 2022/0078031 A1    Mar. 10, 2022

(30) Foreign Application Priority Data

Sep. 8, 2020 (TW) ................ 109130740

(51) Int. Cl.
*H04L 9/32* (2006.01)
*H04L 9/08* (2006.01)

(52) U.S. Cl.
CPC .......... *H04L 9/3265* (2013.01); *H04L 9/0825* (2013.01); *H04L 9/0847* (2013.01); *H04L 9/3268* (2013.01)

(58) Field of Classification Search
CPC ... H04L 9/3265; H04L 9/0825; H04L 9/0847; H04L 9/3268; H04L 63/0823;
(Continued)

(56) References Cited

U.S. PATENT DOCUMENTS 7,461,250 B1 * 12/2008 Duane .................. H04L 9/3263
    713/157
9,736,145 B1 * 8/2017 Hayes .................. H04L 9/321
(Continued)

FOREIGN PATENT DOCUMENTS

EP    3 451 218 A1    3/2019
TW    201905688 A    2/2019
(Continued)

OTHER PUBLICATIONS

Authority, P. C. A., and G. P. O. Subordinate. "X. 509 Certificate Policy for the Government Printing Office Public Key Infrastructure (PKI)(including the GPO Principal Certification." (2020). (Year: 2020).*

(Continued)

*Primary Examiner* — Techane Gergiso
(74) *Attorney, Agent, or Firm* — McClure, Qualey & Rodack, LLP

(57) ABSTRACT

A certificate management system includes an electronic device and a server. The electronic device is configured to transmit a certificate application request. The server is configured to sign a device certificate corresponding to the electronic device through an intermediate certificate device after receiving the certificate application request, and transmit the device certificate and the Internet address of the server to the electronic device. The electronic device stores the device certificate and the Internet address of the server to complete the certificate issuance operation.

13 Claims, 5 Drawing Sheets

(58) Field of Classification Search
CPC .............. H04L 9/3263; H04L 2209/38; H04L 2209/64; G06F 21/33; H04W 12/069; G06Q 20/38215
See application file for complete search history.

(56) References Cited

U.S. PATENT DOCUMENTS

| | | | |
|---|---|---|---|
| 9,819,661 B2 | 11/2017 | Stern | |
| 9,847,883 B2* | 12/2017 | Le Saint | ............... H04L 9/3234 |
| 11,165,591 B2* | 11/2021 | Thakore | .............. H04L 63/0823 |
| 2008/0034204 A1* | 2/2008 | Lakshminarayanan | ...................... H04L 63/0823 713/158 |
| 2008/0065778 A1* | 3/2008 | Deishi | ................. H04L 63/0823 709/229 |
| 2010/0325427 A1 | 12/2010 | Ekberg et al. | |
| 2011/0213966 A1* | 9/2011 | Fu | ......................... H04L 9/3268 713/158 |
| 2012/0166796 A1* | 6/2012 | Metke | ................... H04L 9/3263 713/158 |
| 2015/0281278 A1 | 10/2015 | Gooding et al. | |
| 2016/0315777 A1* | 10/2016 | Lloyd | ................. H04L 63/0823 |
| 2017/0006022 A1* | 1/2017 | Gunti | ................... H04L 63/108 |
| 2018/0069708 A1* | 3/2018 | Thakore | .................. H04L 9/006 |
| 2018/0183586 A1* | 6/2018 | Bhargav-Spantzel | ...................... G06F 21/32 |
| 2018/0351751 A1* | 12/2018 | Kumar | .................. H04L 63/064 |
| 2019/0182237 A1* | 6/2019 | Queralt | ................. H04L 9/3263 |
| 2019/0260595 A1* | 8/2019 | Walton | .................. H04L 9/3268 |
| 2020/0015087 A1 | 1/2020 | Pak et al. | |
| 2020/0052911 A1* | 2/2020 | Popoveniuc | ........ H04L 63/0428 |
| 2020/0127992 A1 | 4/2020 | Pham | |

FOREIGN PATENT DOCUMENTS

| | | |
|---|---|---|
| TW | I674533 B | 10/2019 |
| TW | 202019124 A | 5/2020 |

OTHER PUBLICATIONS

Chinese language office action dated Dec. 31, 2020, issued in application No. TW 109130740.
European Search Report dated May 19, 2021, issued in application No. EP 20213189.2.

* cited by examiner

CERTIFICATE MANAGEMENT SYSTEM AND CERTIFICATE MANAGEMENT METHOD

CROSS REFERENCE TO RELATED APPLICATIONS

This application claims priority of Taiwan Patent Application No. 109130740, filed on Sep. 8, 2020, the entirety of which is incorporated by reference herein.

BACKGROUND OF THE INVENTION

Field of the Invention

The present disclosure relates to a management system and, in particular, to a certificate management system and certificate management method.

Description of the Related Art

Traditionally, serial numbers and passwords are used to identify devices that can be connected to the Internet. However, the method of using a serial number with a password may have the following risks and problems. The serial number of the device may be repeated. In a closed network environment (such as internal devices in a company), each device can be assigned a unique serial number. However, in an open Internet environment, multiple devices may correspond to duplicate serial numbers. Once the identity of a device cannot be confirmed, there is a risk of leakage of confidential information. In addition, the serial number is a series of regular consecutive numbers. As long as hackers understand the rules, it is very easy to alter the serial number. Because this method is easy for hackers to crack, especially when the number of networked devices is large and located far away, it is difficult for device managers to set different passwords for the devices one by one. The most common practice is to use the same password for each device, which increases the insecurity of device data obtained by hackers. Furthermore, using the serial number with the password only provides the back-end host device with a method to verify the identity of the networked device, but it cannot allow the networked device to verify the identity of the back-end host device.

On the other hand, when the networked device transmits data to the back-end host device, the communication data does not have any encryption mechanisms, or the communication data uses a fixed symmetric key for encryption. It is quite easy for hackers to intercept data packets on open networks and crack a fixed symmetric key through brute force algorithms. When the number of networked devices is large and located far away, the stolen devices or the devices that need to be eliminated cannot be managed remotely.

Therefore, how to manage the life cycle of a networked device key and a networked device certificate has become one of the problems to be solved in this field.

BRIEF SUMMARY OF THE INVENTION

In order to solve the above problems, the present disclosure provides a certificate management system. The certificate management system includes an electronic device and a server. The electronic device is configured to transmit a certificate application request. The server is configured to sign a device certificate corresponding to the electronic device through an intermediate certificate device after receiving the certificate application request, and transmit the device certificate and the Internet address of the server to the electronic device. The electronic device stores the device certificate and the Internet address of the server to complete the certificate issuance operation.

In accordance with one feature of the present invention, the present disclosure provides a certificate management method. The certificate management method includes the following steps: using a server to receive a certificate application request from an electronic device; issuing a device certificate corresponding to the electronic device through an intermediate certificate device; and transmitting the device certificate and the Internet address of the server to the electronic device. The electronic device stores the device certificate and the Internet address of the server to complete the certificate issuance operation.

The certificate management system and certificate management method of the present invention provide a method for managing the life cycle of an electronic device key and electronic device certificate of a networked electronic device, including electronic device key generation, electronic device certificate generation, electronic device updating, and electronic device certificate revocation. Through the issuance of certificates, the function of identification between electronic devices and electronic devices and between electronic devices and servers can be provided to ensure the security of confidential data transmission.

BRIEF DESCRIPTION OF THE DRAWINGS

In order to describe the manner in which the above-recited and other advantages and features of the disclosure can be obtained, a more particular description of the principles briefly described above will be rendered with reference to specific examples thereof which are illustrated in the appended drawings. Understanding that these drawings depict only exemplary aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
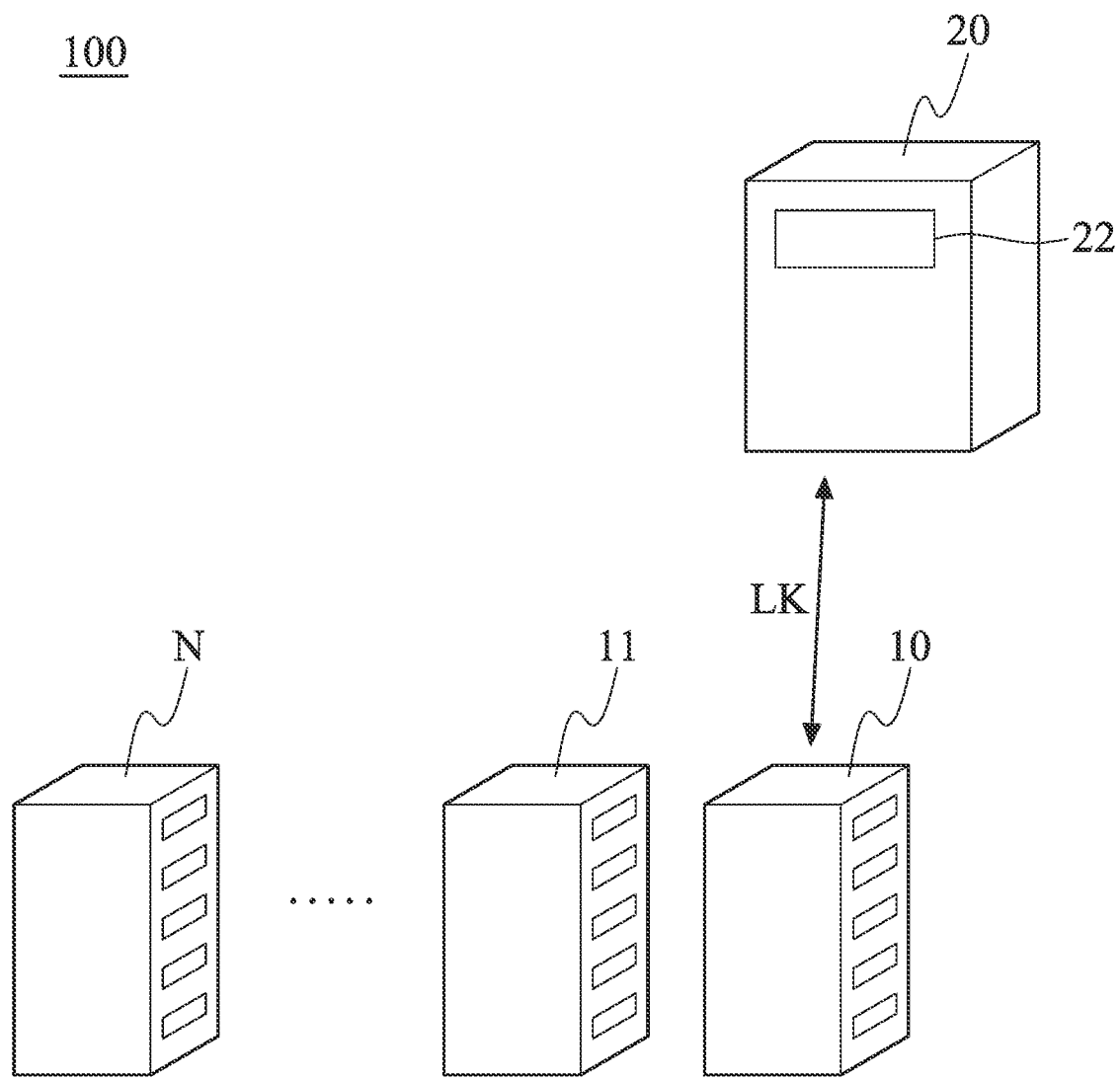
FIG. 1 is a schematic diagram of a certificate management system in accordance with one embodiment of the present disclosure.
Figure 2:
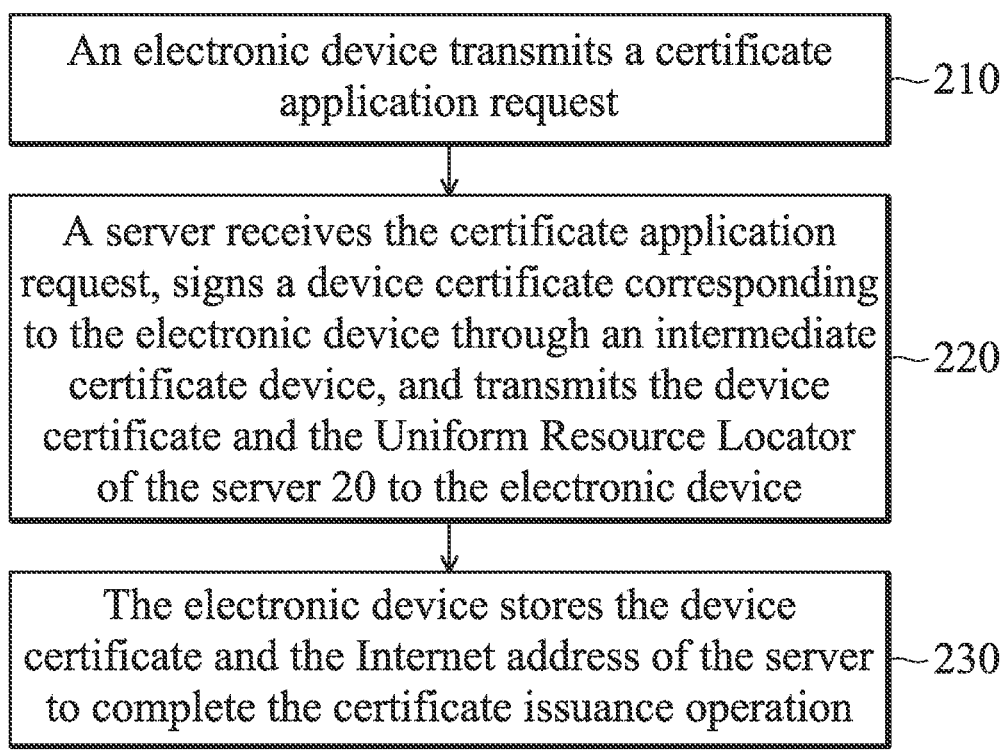
FIG. 2 is a flowchart of a certificate management method in accordance with one embodiment of the present disclosure.

Referring to FIGS. 1-2 together, FIG. 1 is a schematic diagram of a certificate management system 100 in accordance with one embodiment of the present disclosure. FIG. 2 is a flowchart of a certificate management method 200 in accordance with one embodiment of the present disclosure.

As shown in FIG. 1, the certificate management system 100 includes an electronic device 10 and a server 20. The electronic device 10 is a device with a networking function, such as a mobile phone, a tablet, a laptop, etc. The electronic device 10 and the server 20 establish a communication link LK through wireless communication (for example, using Wi-Fi, 3G, 4G, 5G, LTE, or other communication technologies).

In one embodiment, the communication method between the electronic device 10 and the server 20, in addition to the application of wireless communication, such as the application of Wi-Fi, 3G, 4G, 5G or Long Term Evolution (LTE) to establish a communication link. It can also use wired communication, such as Ethernet technology communication.

In one embodiment, the server 20 includes an intermediate certificate device 22. In one embodiment, the intermediate credential device 22 can be implemented by an integrated circuit such as a micro controller, a microprocessor, a digital signal processor, an application specific integrated circuit (ASIC), or a logic circuit. In one embodiment, the intermediate credential device 22 can be implemented by software, firmware, or hardware. Since the root certificate must be placed behind several layers of security protection, the intermediate certificate device 22 is used as a proxy device to ensure that the key of the root certificate is absolutely inaccessible. Since the root certificate itself signs the intermediate certificate, the intermediate certificate can be used to sign the Secure Sockets Layer (SSL) for installation and maintenance. This is a standard technology, so it won't repeat here.

The implementation method of the certificate management method 200 is described below.

In step 210, an electronic device 10 transmits a certificate application request.

In one embodiment, the certificate application request sent by the electronic device 10 includes information such as the factory serial number, factory time, and factory date of the electronic device 10.

In step 220, a server 20 receives the certificate application request, signs a device certificate corresponding to the electronic device 10 through an intermediate certificate device 22, and transmits the device certificate and the Uniform Resource Locator (URL) of the server 20 to the electronic device 10.

In one embodiment, the intermediate certificate device 22 is located in the server 20, and the intermediate certificate device 22 is an X.509 certificate device. The device certificate generated by the intermediate certificate device 22 is an X.509 certificate, and the X.509 certificate is a leaf certificate in X.509 certificate chain technology. The X.509 certificate is encrypted with an asymmetric key.

In an embodiment, the X.509 certificate chain technology can be a multi-layered architecture (such as a tree structure). Each level certificate can be pushed up to the root certificate. The certificate signed to the last level (without sub-certificates) is called a leaf certificate. This feature of X.509 certificate chain technology can be used more flexibly on multiple model devices. For example, the first type of model equipment of a company (for example, 100 model equipment) is signed with a layer of intermediate certificate (for example, using 100 intermediate certificates). The second type of model equipment (for example, 200 model equipment) is signed with another layer of intermediate certificates (for example, using 200 other layer of intermediate certificates). Therefore, the use of X.509 certificate chain technology can make the issuance of certificates more flexible.

In one embodiment, the device credentials used in this case are all leaf certificates.

However, the present invention is not limited to the use of X.509 certificate chain technology, as long as it is a mechanism capable of generating security certificates can be applied.

In step 230, the electronic device 10 stores the device certificate and the Internet address of the server 20 to complete the certificate issuance operation.

The certificate management method 200 can complete signing the certificate of the electronic device 10.

In one embodiment, the electronic device 10 to the electronic device N are located on the device production line, and each electronic device can sign its own certificate through the certificate management method 200.

Figure 3:
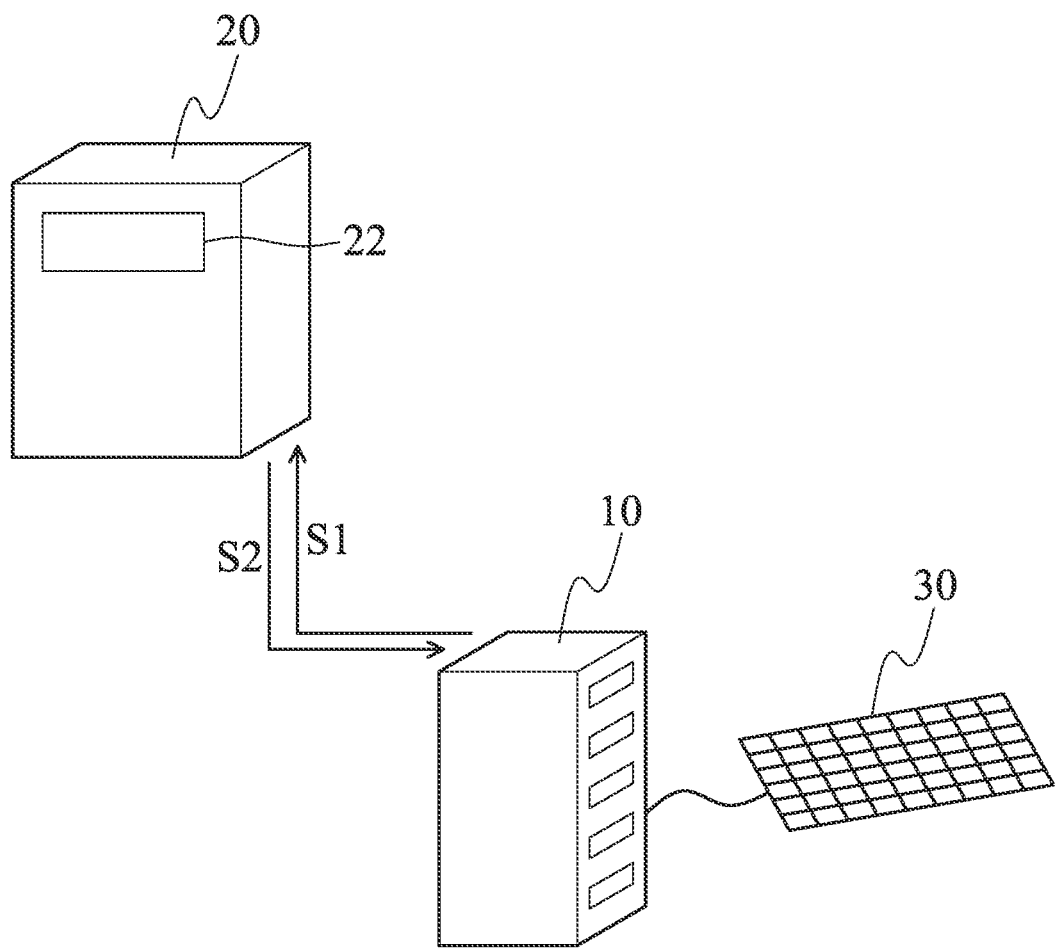
FIG. 3 is a schematic diagram of a certificate management system in accordance with one embodiment of the present disclosure.

Referring to FIG. 3 together, FIG. 3 is a schematic diagram of a certificate management system 300 in accordance with one embodiment of the present disclosure. In one embodiment, after the electronic device 10 is shipped or sold (indicating that the electronic device 10 has completed the certificate issuance operation), it is deployed on the scene (for example, the electronic device 10 is electrically coupled to the solar panel 30) and activated, and the identity verification process of the electronic device 10 is started.

In the identity verification process, the electronic device 10 sends a connection request and device certificate to the server (step S1). The server 20 uses the Public Key Infrastructure (PKI) identity verification mechanism to perform multiple verification operations on the device certificate with the intermediate certificate device 22. The verification operation includes: confirming that the electronic device 10 does have the device certificate, confirming that the device certificate is a leaf certificate in X.509 certificate chain technology, checking that the device certificate is not in a certificate revocation list, and/or checking that the valid time of the device certificate has not expired, etc.

In terms of cryptography, the public key infrastructure architecture links the user's personal identity with the public key through a digital certificate certification authority. The identity of each certificate authority user must be unique. The link relationship is established through the registration and release process, depending on the level of guarantee. The link relationship may be completed by various software of the certificate center or completed under human supervision. The role of public key infrastructure architecture that determines the link relationship is called the registry management center. The registry management center ensures that the public key and personal identity link, thereby preventing denial. The public key infrastructure architecture is a known technology, so it won't repeat it here.

When the device certificate has passed all verification operations, the server 20 sends a verification success message to the electronic device 10 (step S2), and allows the electronic device 10 to perform subsequent operations, for example, reading the file in the server 20. When the device certificate fails to pass all the verification operations, the server 20 sends a verification failure message to the electronic device 10.

Figure 4:
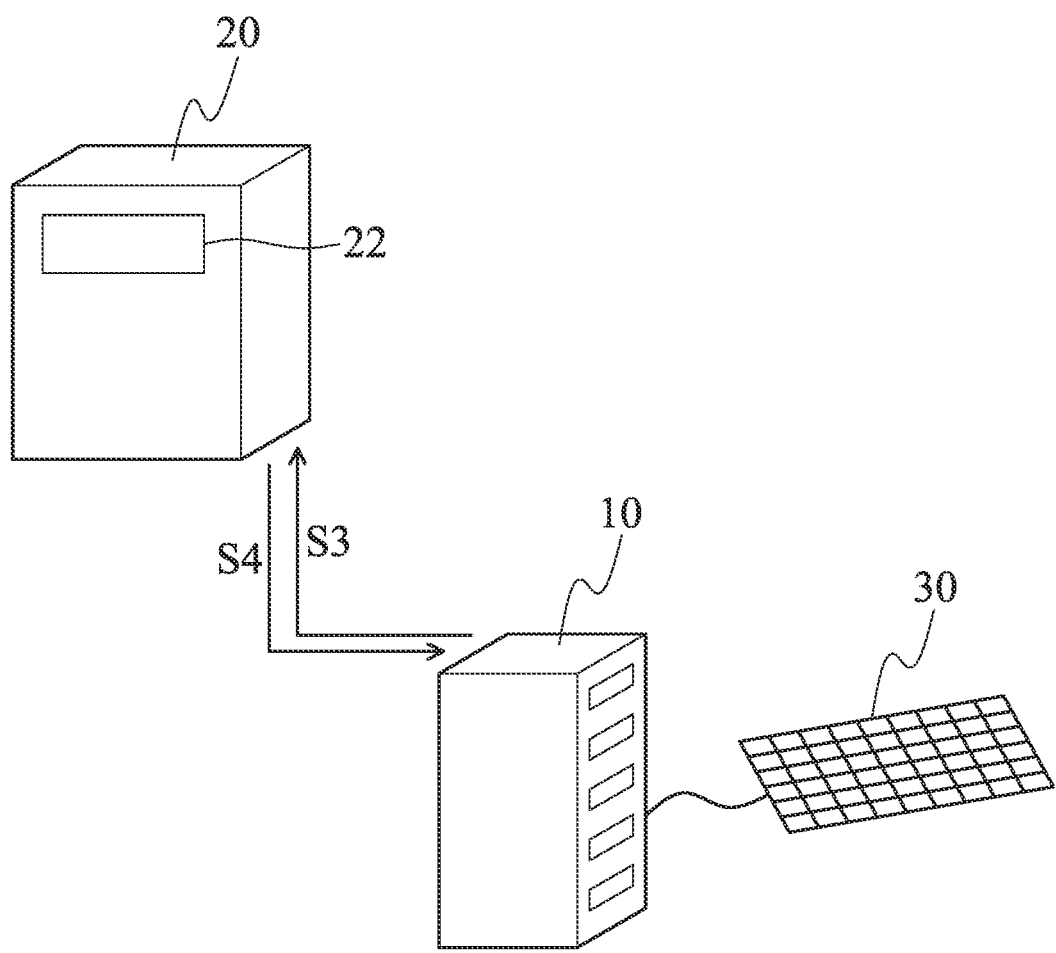
FIG. 4 is a schematic diagram of the removal of electronic equipment of the certificate management system in accordance with one embodiment of the present disclosure.

Referring to FIG. 4, FIG. 4 is a schematic diagram of the removal of electronic equipment of the certificate management system 400 in accordance with one embodiment of the present disclosure. After the electronic device 10 receives the verification success message (for example, in step S2 in FIG. 3, the electronic device 10 receives the verification success message from the server 20), and the server 20 does not receive the verification success message from the electronic device 10 for more than a receiving time (for example, the server 20 has not received a request from the electronic device 10 for more than one day), the server 20 determines that the electronic device 10 is missing or has a problem (for example, hacked or damaged), and the server 10 revokes the device certificate. The server 10 writes the device certificate into the certificate revocation list. After the server 10 revokes the device certificate, if the electronic device 10 restarts and the electronic device 10 sends a connection request to the server 20 (step S3), the server 20 will return an authentication failure message to the electronic device 10 (step S4).

Figure 5:
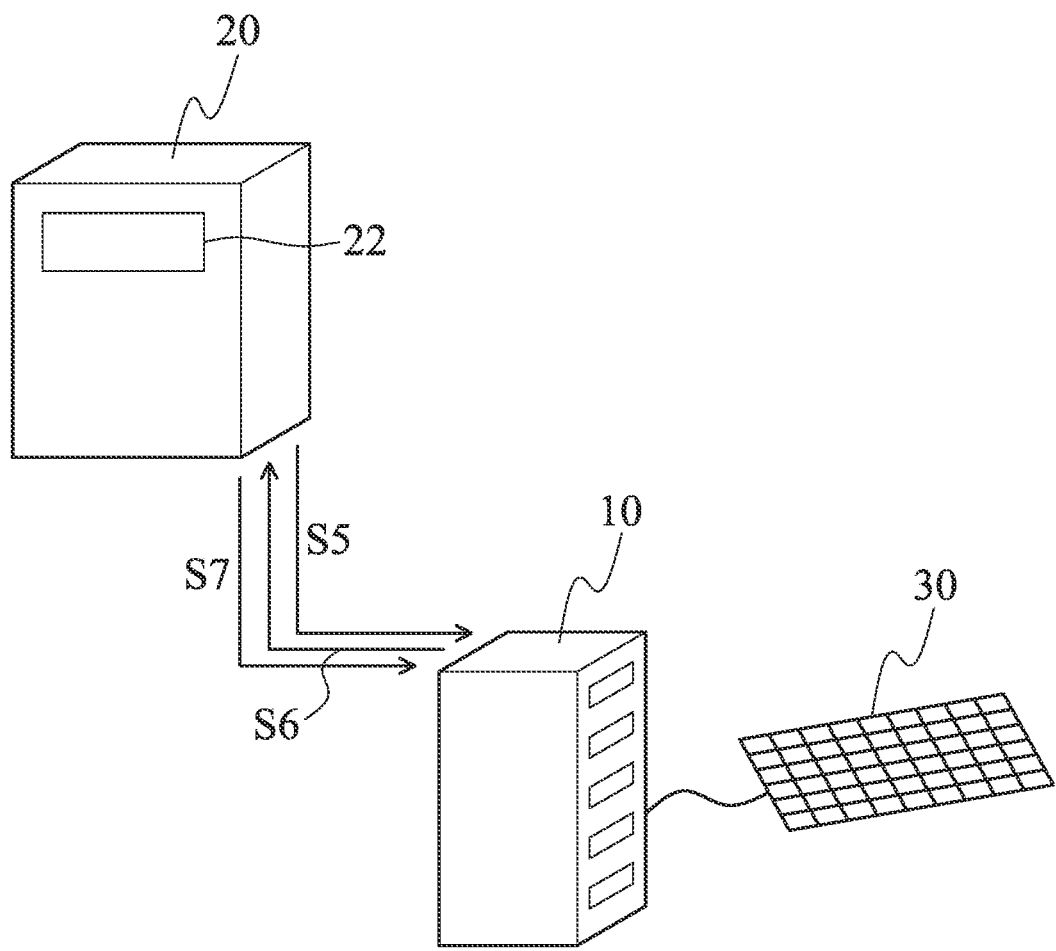
FIG. 5 is a schematic diagram of an updated certificate of the certificate management system in accordance with one embodiment of the present disclosure.

Please refer to FIG. 5. FIG. 5 is a schematic diagram of an updated certificate of the certificate management system 500 in accordance with one embodiment of the present disclosure.

In the aforementioned identity verification process, the intermediate credential device 22 in the server 20 performs multiple verification operations on the device certificate, and the verification operation includes checking whether the valid time of the device certificate has expired. When the server 20 checks that the valid time of the device certificate is less than a date threshold (for example, 90 days), the server 20 sends a message that the certificate will expire soon to the electronic device 10 (step S5). After the electronic device 10 receives the message that the certificate will expire soon, the electronic device 10 sends a certificate update request to the server 20 (step S6). The server 20 transmits an update certificate to the electronic device 10 (step S7) to complete the update of the certificate.

The method of the present invention, or a specific type or part thereof, can exist in the form of code. The code can be contained in physical media, such as floppy disks, CDs, hard disks, or any other machine-readable (such as computer-readable) storage media, or not limited to external forms of computer program products. When the program code is loaded and executed by a machine, such as a computer, the machine becomes a device for participating in the present invention. The code can also be transmitted through some transmission media, such as wire or cable, optical fiber, or any transmission type. When the code is received, loaded and executed by a machine, such as a computer, the machine becomes used to participate in this Invented device. When implemented in a general-purpose processing unit, the program code combined with the processing unit provides a unique device that operates similar to the application of specific logic circuits.

The certificate management system and certificate management method of the present invention provide a method for managing the life cycle of an electronic device key and electronic device certificate of networked electronic device, including electronic device key and electronic device certificate generation, electronic device update, electronic device certificate revocation. Via the issuance of certificates, the function of identification between electronic devices and electronic devices and between electronic devices and servers can be provided to ensure the security of confidential data transmission.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A certificate management system, comprising:
   an electronic device, configured to transmit a certificate application request; and
   a server, configured to sign a device certificate corresponding to the electronic device through an intermediate certificate device after receiving the certificate application request, and transmit the device certificate and an Internet address of the server to the electronic device;
   wherein the electronic device stores the device certificate and the Internet address of the server to complete a certificate issuance operation,
   wherein when the electronic device completes the certificate issuance operation, the electronic device sends a connection request and the device certificate to the server, and the server uses a Public Key Infrastructure (PKI) identity authentication mechanism to trigger the intermediate certificate device to perform a number of verification operations on the device certificate, wherein the verification operations comprise:
   confirming that the electronic device does possess the device certificate, confirming that the device certificate is a leaf certificate in the X.509 certificate chain technology, checking that the device certificate is not in a certificate revocation list, and checking that a valid time of the device certificate has not expired;
   wherein when the device certificate passes all the verification operations, the server sends a verification success message to the electronic device; when the device certificate fails to pass all the verification operations, the server sends a verification failure message to the electronic device; and
   wherein after the electronic device is completed the certificate issuance operation, and the electronic device is electrically coupled to a solar panel and the electronic device is activated, then an identity verification process of the electronic device is started.

2. The certificate management system of claim 1, wherein the intermediate certificate device is located in the server, the intermediate certificate device is an X.509 certificate device, and the device certificate generated by the intermediate certificate device is an X.509 certificate; wherein the X.509 certificate is the leaf certificate in an X.509 certificate chain technology, and the X.509 certificate is encrypted with an asymmetric key.

3. The certificate management system of claim 1, wherein when the electronic device receives the verification success message, and the server does not receive any request from the electronic device for more than a receiving time, the server determines that the electronic device is missing or has a problem, and the server removes the device certificate and writes the device certificate into the certificate revocation list.

4. The certificate management system of claim 1, wherein when the server checks that the valid time of the device certificate is less than a date threshold, the server sends a certificate expire message to the electronic device; wherein the electronic device sends a certificate update request to the server after receiving the certificate expire message, and the server sends an update certificate to the electronic device.

5. A certificate management system, comprising:
a server device, configured to receive a certificate application request from an electronic device, issue a device certificate corresponding to the electronic device through an intermediate certificate device, and transmit the device certificate and an Internet address of the server device to the electronic device;
wherein the electronic device stores the device certificate and the Internet address of the server device to complete the certificate issuance operation;
wherein when the electronic device completes the certificate issuance operation, the electronic device sends a connection request and the device certificate to the server, and the server device uses a Public Key Infrastructure (PKI) identity authentication mechanism to trigger the intermediate certificate device to perform a number of verification operations on the device certificate, wherein the verification operations comprise:
confirming that the electronic device does possess the device certificate, confirming that the device certificate is a leaf certificate in the X.509 certificate chain technology, checking that the device certificate is not in a certificate revocation list, and checking that a valid time of the device certificate has not expired;
wherein when the device certificate passes all the verification operations, the server device sends a verification success message to the electronic device; when the device certificate fails to pass all the verification operations, the server device sends a verification failure message to the electronic device; and
wherein after the electronic device is completed the certificate issuance operation, and the electronic device is electrically coupled to a solar panel and the electronic device is activated, then an identity verification process of the electronic device is started.

6. The certificate management system of claim 5, wherein the intermediate certificate device is located in the server, the intermediate certificate device is an X.509 certificate device, and the device certificate generated by the intermediate certificate device is an X.509 certificate; wherein the X.509 certificate is the leaf certificate in an X.509 certificate chain technology, and the X.509 certificate is encrypted with an asymmetric key.

7. The certificate management system of claim 5, wherein when the electronic device receives the verification success message, and the server device does not receive any request from the electronic device for more than a receiving time, the server device determines that the electronic device is missing or has a problem, and the server device removes the device certificate and writes the device certificate into the certificate revocation list.

8. The certificate management system of claim 5, wherein when the server device checks that the valid time of the device certificate is less than a date threshold, the server device sends a certificate expire message to the electronic device; wherein the electronic device sends a certificate update request to the server device after receiving the certificate expire message, and the server device sends an update certificate to the electronic device.

9. A certificate management method, comprising:
receiving a certificate application request from an electronic device at a server, wherein the electronic device is electrically coupled to a solar panel; and
issuing a device certificate corresponding to the electronic device through an intermediate certificate device, and transmitting the device certificate and an Internet address of the server to the electronic device;
wherein the electronic device stores the device certificate and the Internet address of the server to complete the certificate issuance operation;
wherein when the electronic device completes the certificate issuance operation and the electronic device is activated, then an identity verification process of the electronic device is started, wherein the identity verification process comprises:
the electronic device sends a connection request and the device certificate to the server, and the server uses a Public Key Infrastructure (PKI) identity authentication mechanism to trigger the intermediate certificate device to perform a number of verification operations on the device certificate, wherein the verification operations comprise:
confirming that the electronic device does possess the device certificate, confirming that the device certificate is a leaf certificate in the X.509 certificate chain technology, checking that the device certificate is not in a certificate revocation list, and checking that the valid time of the device certificate has not expired;
wherein when the device certificate passes all the verification operations, the server sends a verification success message to the electronic device;
when the device certificate fails to pass all the verification operations, the server sends a verification failure message to the electronic device.

10. The certificate management method of claim 9, wherein the intermediate certificate device is located in the server, the intermediate certificate device is an X.509 certificate device, and the device certificate generated by the intermediate certificate device is an X.509 certificate; wherein the X.509 certificate is the leaf certificate in an X.509 certificate chain technology, and the X.509 certificate is encrypted with an asymmetric key.

11. The certificate management method of claim 9, wherein when the electronic device receives the verification success message, and the server does not receive any request from the electronic device for more than a receiving time, the server determines that the electronic device is missing or has a problem, and the server removes the device certificate and writes the device certificate into the certificate revocation list.

12. The certificate management method of claim 11, wherein when the server checks that the valid time of the device certificate is less than a date threshold, the server sends a certificate expire message to the electronic device; wherein the electronic device sends a certificate update request to the serve rafter receiving the certificate expire message, and the server sends an update certificate to the electronic device.

13. The certificate management method of claim 9, further comprising: transmitting the certificate application request using the electronic device.

\* \* \* \* \*